United States Patent
Sinn

(10) Patent No.: US 6,879,874 B2
(45) Date of Patent: Apr. 12, 2005

(54) EVALUATING EXCESSIVE TOLERANCES IN NC PARTS PROGRAMS

(75) Inventor: Christof Sinn, Nuremberg (DE)

(73) Assignee: Siemens Aktiengesellschaft, München (DE)

( * ) Notice: Subject to any disclaimer, the term of this patent is extended or adjusted under 35 U.S.C. 154(b) by 240 days.

(21) Appl. No.: 10/233,782

(22) Filed: Sep. 3, 2002

(65) Prior Publication Data

US 2003/0045965 A1 Mar. 6, 2003

(30) Foreign Application Priority Data

Sep. 3, 2001 (DE) .......................................... 101 43 046
Feb. 6, 2002 (DE) .......................................... 102 04 839

(51) Int. Cl.[7] .............................................. G06F 19/00
(52) U.S. Cl. ...................................... 700/181; 700/182
(58) Field of Search .............................. 700/181–184, 700/159, 186, 187, 191–193, 161

(56) References Cited

U.S. PATENT DOCUMENTS

| | | | | | |
|---|---|---|---|---|---|
| 5,043,906 A | * | 8/1991 | Jepson | ........................ | 700/192 |
| 5,189,626 A | * | 2/1993 | Colburn | ...................... | 700/182 |
| 5,453,934 A | * | 9/1995 | Taghavi et al. | .............. | 700/182 |
| 5,923,561 A | * | 7/1999 | Higasayama et al. | ........ | 700/186 |
| 6,073,058 A | * | 6/2000 | Cossen et al. | .............. | 700/184 |
| 6,107,768 A | * | 8/2000 | Ouchi et al. | .............. | 318/568.1 |
| 6,167,325 A | * | 12/2000 | Kamiguchi et al. | ......... | 700/183 |
| 6,311,098 B1 | * | 10/2001 | Higasayama et al. | ....... | 700/159 |
| 6,363,298 B1 | * | 3/2002 | Shin et al. | .................. | 700/160 |

OTHER PUBLICATIONS

K.-H. Maier: Ein auf uniform mäandrisch vorliegenden Punktdaten basierender Vernetzungsalgorithmus, in: A&D GT4, 2001.

* cited by examiner

*Primary Examiner*—Leo Picard
*Assistant Examiner*—Zoila Cabrera
(74) *Attorney, Agent, or Firm*—Henry M. Feiereisen

(57) ABSTRACT

In a process for determining when tolerances are exceeded during generation of NC parts programs, the defined CAD geometry is converted into an equivalent grid, preferably a triangular grid. A surface corresponding to the NC parts programs in form of a triangular grid is generated after conversion of the CAD geometry. The parts program takes into consideration the geometric attributes of the milling tool (diameter, shape, etc.). After two triangular grids have been generated from the starting data, i.e. the CAD geometry and the NC parts program, the distance between the two grids can be calculated and visualized.

20 Claims, 2 Drawing Sheets

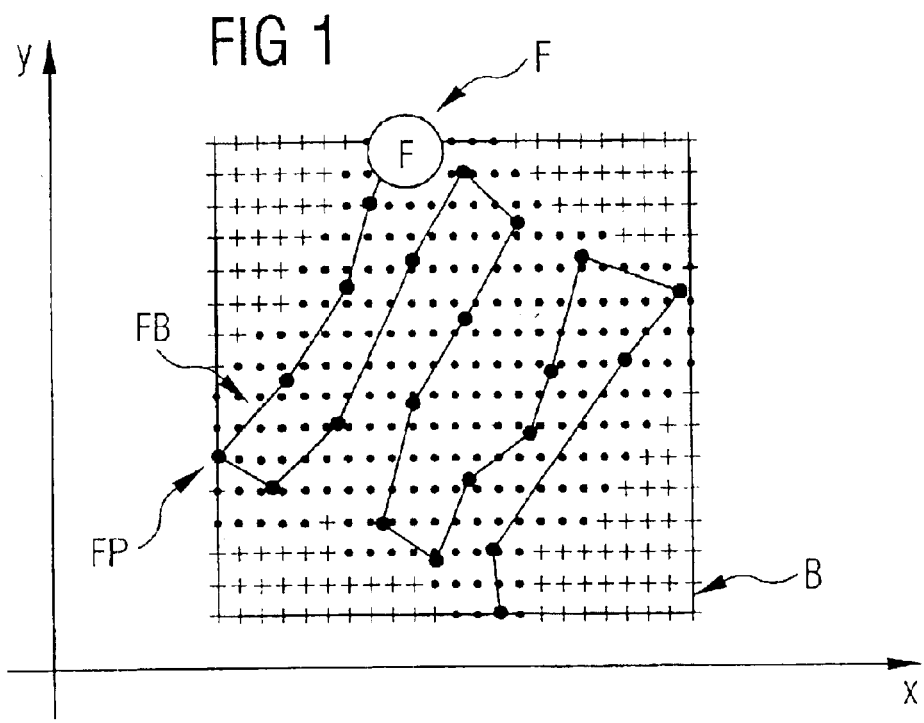
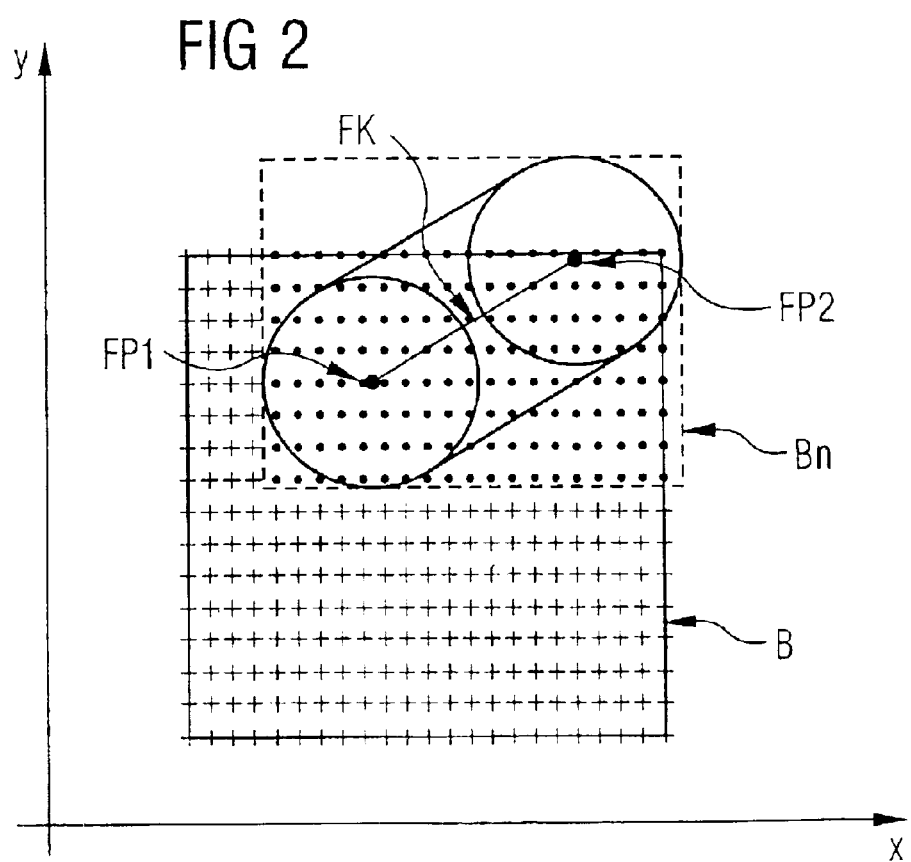

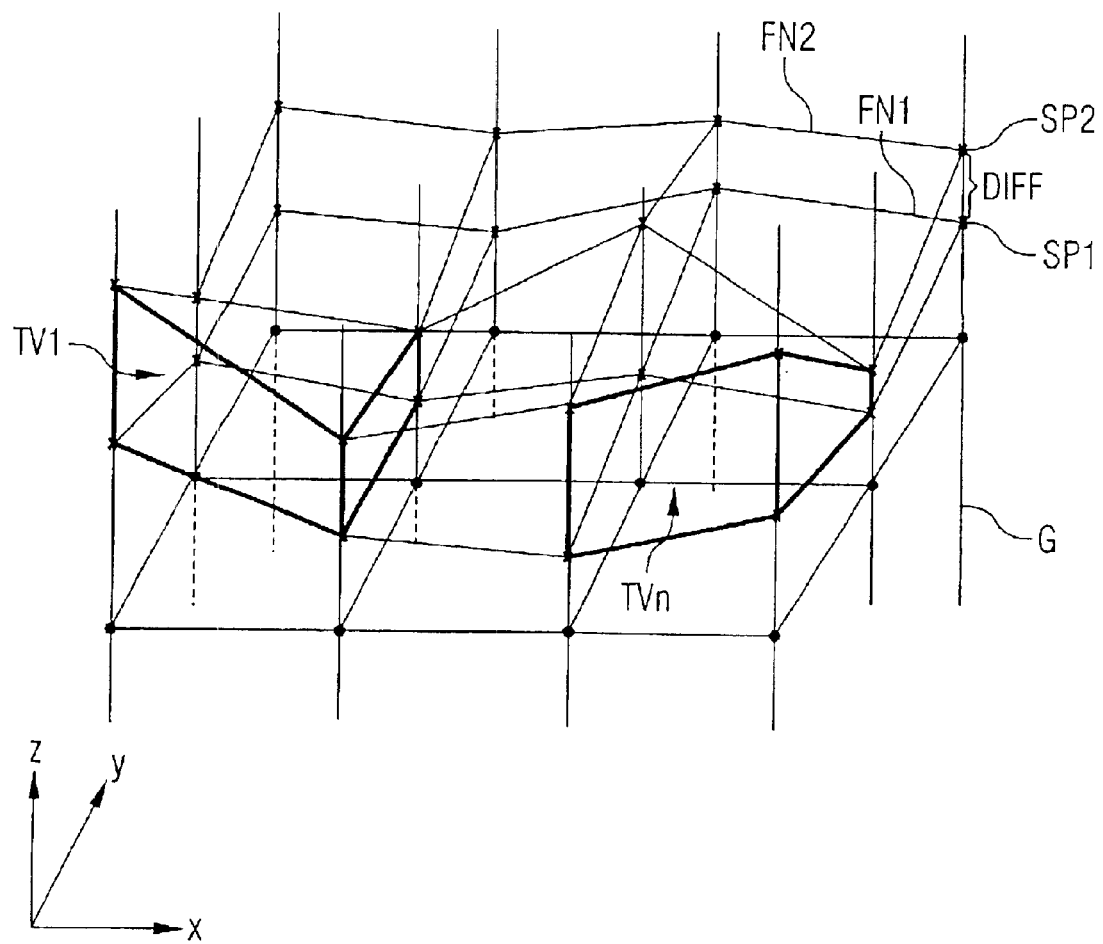

EVALUATING EXCESSIVE TOLERANCES IN NC PARTS PROGRAMS

CROSS-REFERENCES TO RELATED APPLICATIONS

This application claims the priorities of German Patent Applications Serial No. 101 43 046.9, filed Sep. 3, 2001 and 102 04 839.8, filed Feb. 6, 2002, the subject matter of which is incorporated herein by reference.

BACKGROUND OF THE INVENTION

The present invention relates to a method for evaluating excessive tolerances in generating NC parts programs, as well as a device and a computer program product for carrying out the method.

To create NC parts programs, a model maker has to generate an NC parts programs from a given CAD geometry. However, the model maker had until now no way to determine if the generated parts programs lies within the tolerances associated with a part—he could only rely on his experience.

In CNC-controlled processing machines, a workpiece is typically either encoded directly or the workpiece is first modeled using a CAD system and thereafter converted into an equivalent CNC parts program. The resulting CNC parts programs and/or the CAD model then correspond to perfect processing commands for the processing machine. The CNC programs is then loaded into a CNC controller and the processing machine is controlled according to the CNC program.

If the workpiece manufactured according to this CNC program is within the desired manufacturing tolerances of an ideal workpiece, then this approach causes no problem. However, if the manufactured workpiece does not meet the desired requirements, then the process needs to be optimized and the necessary changes, for example in the CNC program, have to be made so that an acceptable workpiece can be produced.

It is possible to change sequentially individual processing commands and/or individual operating parameters of the processing machine, to produce a new workpiece and to then test the new workpiece. This approach is very time consuming and expensive, and wastes material. Moreover, the cause for deviations between the actually manufactured workpiece and the desired workpiece it is frequently not known.

For this reason, there is an increasing trend to simulate mechatronic systems, such as industrial processing machines. However, a visualization environment is needed for analyzing the simulation results and for realistically rendering the surface of a workpiece generated by the simulation.

Such a visualization environment is particularly important because visualization allows a better evaluation of the contours of several different workpieces calculated by the simulation system or of the differences between the actually produced workpiece and the desired workpiece.

Modern visualization elements provide three-dimensional rendering and can be integrated with other applications. The rendered content represents orthographic and/or perspective three-dimensional projections which can be interactively changed by the user. The user can typically rotate, displace and size (zoom) the rendered content. User-friendly visualization elements can also allow the user to obtain associated information by selecting certain details, such as for example the dimensions, spatial location or relationship to other details of the scene.

This leads to a better understanding of the manufacturing process. Moreover, the surface quality of the workpiece to be manufactured can be determined and analyzed already in the design stage, so that the existing parameter values of the control and drive of the machine tool can be optimized.

Accordingly, a "virtual workpiece" can be manufactured and/or the manufacturing operation can be carried out "virtually." It is hence not necessary to actually produce a workpiece. In principle, there is not even a need for a processing machine. The number of prototypes can be significantly reduced through simulation and virtual production which saves costs.

Such a tool does not yet exists for NC parts program generation. Instead, the model maker creates a parts program which is subsequently used in prototype manufacturing. If the produced workpiece does not meet the requirements, i.e., if the workpiece dimensions are outside the stated tolerances, then the model maker has to change the parts program at the locations where the tolerances are exceeded.

Accordingly, it would be desirable to be able to determine when tolerances are exceeded in the generation of NC parts programs, so that the user can clearly and effectively display even small differences between the surfaces and evaluate the presence and extent of possible existing excess tolerances.

SUMMARY OF THE INVENTION

According to one aspect of the invention, a method for determining excessive tolerances in the generation of NC parts programs includes converting a predetermined CAD geometry into a first grid, with the first grid defining a first grid surface, generating NC program data of an NC parts program based on the predetermined CAD geometry, generating a second grid from the NC program data, with the second grid defining a second grid surface, determining distance values between the first and the second grid, and rendering a visualization of one of the determined distance values and the distance values that exceed a predetermined tolerance threshold.

According to another aspect of the invention, a device for determining excessive tolerances in the generation of NC parts programs includes means for converting a predetermined CAD geometry into a first grid, with the first grid defining a first grid surface, means for generating NC program data of an NC parts program based on the predetermined CAD geometry, means for generating a second grid from the NC program data, with the second grid defining a second grid surface, means for determining distance values between the first and the second grid, and means for rendering a visualization of one of the determined distance values and the distance values that exceed a predetermined tolerance threshold.

According to yet another aspect of the invention, a computer program product adapted to run on a digital simulation computer includes computer program means for converting a predetermined CAD geometry into a first grid defining a first grid surface, computer program means for generating NC program data of an NC parts program based on the predetermined CAD geometry, computer program means for generating a second grid from the NC program data, with the second grid defining a second grid surface, computer program means for determining distance values between the first and the second grid, and computer program means for rendering a visualization of one of the determined distance values and the distance values that exceed a predetermined tolerance threshold.

Advantageously, the first grid and the second grid can be triangular grids, with the second grid surface corresponding to one of the NC program data, a control output and an actual position value. The grid surface consisting of triangles can be computed from the computed contour points. The grid is subsequently supplied to a visualization component, for example a computer with a corresponding graphics display. One approach for generating a grid surface from contour points is described, for example, by Maier, K. -H.: "Network algorithm based on 3-D data points distributed uniformly in a meander pattern", Technical Report, Siemens AG, Nürnberg, 2001.

According to another embodiment, geometric attributes of a tool to be used in an NC machining operation can be defined, and the second grid surface can be determined by taking into account the geometric tool attributes at least for the NC program data. The distance values between the first grid and the second grid can correspond to a vertical distance determined in a positive or negative z-direction or to a distance in a surface-normal direction of at least one of the first and second grids. Alternatively, the distance values between the first grid and the second grid correspond to an actual distance between the first grid and the second grid at a grid point.

The method of the invention is advantageous in particular for large workpieces that require small machining tolerances. For example, more than 10 billion grid points may have to be computed in an NC parts program with dimensions of 1 m$^2$ and required tolerances of 10 $\mu$m. The computations become exceedingly long, so that a parallel algorithm may be required. In addition, such large data sets cannot be visualized even with modern processors. Accordingly, only those locations on the workpiece surface (with a suitably selected environment) that exceed the tolerances should be visualized.

Additional embodiments may include one or more of the following features. The surface of one of the first and second grid surfaces can be graphically displayed together with the determined distance values. The determined distance values can be visualized as a fourth attribute or dimension, such as a different color, of the displayed surface. The determined distance values can also be interpolated and an interpolated grid surface can be formed from these values which can then be graphically displayed.

The determined distance values can be rendered as interpolated colors, wherein the interpolated color of a distance value interpolated between a color can be assigned to a maximum distance value and a color assigned to a minimum distance value, and the rendered color can be projected onto the second surface which preferably has a different color.

Advantageously, difference volume values can be computed from the determined distance values and rendered as a visualization, either in transparent form or as interpolated colors, wherein the interpolated color of a volume value can be interpolated between a color assigned to a maximum volume value and a color assigned to a minimum volume value. The first and second grid surfaces can also be defined analytically and the distance values can then be determined continuously based on values derived from the analytically defined first and second surfaces.

Advantageously, a plurality of discrete support points can be determined in three-dimensional space from data corresponding to a workpiece, with the support points located on the first and second grid surfaces. The distance values are then formed between corresponding support points located on the first and second grid surfaces. The effect of a virtual machining tool can be taken into account by modeling the workpiece with a blank workpiece defined by a family of straight lines that extend parallel to a coordinate axis in a three-dimensional space, intersecting the family of straight lines with the virtual machining tool according to a predetermined machining path; and defining from the resulting points of intersection a grid surface corresponding to a workpiece contour. When simulating machining with three coordinate axes, only those points of intersection are taken into consideration that have the smallest coordinate value in the direction of a straight line towards the grid surface that corresponds to the workpiece contour. An initialization value is used for forming the grid surface that corresponds to the workpiece contour for those straight lines without a point of intersection. At least one other family of straight lines extending parallel to at least one other coordinate axis in the three-dimensional space can be defined, wherein the modeled blank workpiece is represented by discrete values in the direction of the at least one other coordinate axis, and wherein the lines of the family in the direction of the at least one other coordinate axis are equidistant from each other.

The method can be used for determining excessive tolerances in the generation of NC parts programs in a virtual manufacturing operation of a workpiece with different machining instructions.

With the method, apparatus and program of the invention, an operator can verify the generated parts program and can receive feedback—taking into account the geometric properties of the milling tool—about those areas of the parts program where the desired tolerances are exceeded. The operator can also obtain information about the magnitude of the deviations.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a two-dimensional top view of an exemplary milling path with a grid surface for representing a workpiece surface;

FIG. 2 is an optimized grid surface based on FIG. 1 for machining with a spherical cutter; and FIG. 3 shows two grid surfaces and a family of straight lines representing a difference volume.

DETAILED DESCRIPTION OF PREFERRED EMBODIMENTS

The invention is directed to a method, an apparatus and a computer program product for determining exceedingly large tolerances in the generation of NC parts programs. In particular, excess tolerances can be advantageously determined based on two grid surfaces.

The technical problem is solved by converting a given CAD geometry to an equivalent grid. In the conventional format VDA-FS, the CAD geometry is first interpreted by a VDA-FS parser. After the CAD geometry has been converted into a grid (advantageously a triangular grid), a corresponding surface in the form of a triangular grid is generated in the NC parts program.

The parts program takes into account the geometric attributes of the milling tool (diameter, shape, etc.). Generating the surface corresponds to a "virtual milling process." After the two triangular grids have been produced from the initial data, i.e., the CAD geometry and NC parts program, the distance between the two grids can be computed.

This can be done in several ways: (1) the vertical distance can determined by computing the separation between the two triangular grids along the positive and negative z-direction; (2) the distance normal, i.e., perpendicular, to the triangular grid can be computed; or (3) the "actual" distance between the two grids can be computed at a grid point (this approach is extremely time-consuming and is therefore not pursued).

The grid surface can be determined, for example, based on uniformly spaced straight lines that extend in the x-and y-direction and are parallel to the vertical z-axis. Preferably, the allowed straight lines must have point-shaped orthogonal projections in the xy-plane that are located inside a rectangle having mutually parallel axes (the definition of the rectangle will be discussed in more detail below). The family of straight lines models a blank workpiece which is represented by discrete data points in the x-and y-direction and extends to infinity along the positive and negative z-direction.

FIG. 1 shows schematically in a two-dimensional representation a top view along the z-axis of a uniformly distributed family of straight lines with a surrounding rectangle B for an exemplary milling path. The observer looks essentially along the z-direction. This straight lines are indicated by circles or crosses. A large circle indicates a spherical cutter F.

Milling points FP are indicated by circles that are greater than those of the straight lines and smaller than those of the cutter F. A resulting milling path FB forms a linearly interpolated polygon in three-dimensional space. It should be mentioned that there is no requirement that the rectangle defining the family of straight lines and the milling points have any special spatial relationship. However, the rectangle B is typically determined by taking into account the milling data.

In an actual milling operation, the cutter F moves according to the programmed path of the center of the cutter (cutter path FB). The cutter hereby removes material from the blank workpiece. The workpiece to be manufactured remains as residual material at the end of the machining process. The disclosed method of the invention imitates this process. The virtual cutter F also moves along the defined cutter path FB and cuts the blank workpiece which is modeled, as described above, by a family of straight lines. That traversed volume can be modeled by two spheres and a cylinder oriented in the milling direction—similar in shape to a pill.

FIG. 2 which is similar to FIG. 1 depicts the traversed volume in more detail. Only the region along the milled edge FK is of interest in the illustration. FP1 denotes the starting point and FP2 the end point of a milling path. The milling edge is the line connecting FP1 and FP2. The volume removed by the cutter F at the starting point FP1 is indicated by a circle, as is the volume at the end point FP2. The volume traversed along the line from FP1 to FP2 is indicated by two lines tangential to the circumference of both circles around FP1 and FP2. When looking at the total surface area formed by these geometries in three-dimensional space, the enclosed volume has again the form of a pill which is formed of two spheres and a cylinder extending in the milling direction.

The lines of the family intersect the volume (pill) traversed by the cutter F along a milled edge FK either not at all, once or twice. When milling along three axes, the workpiece contour is modeled in discrete intervals by the lower points of intersection between all traversed volumes (pills) and all straight lines and the initializing points of all straight lines that do not intersect the traversed volumes. The volumes that are traversed by the cutter F relative to an edge intersect the straight lines. In FIG. 1 depicts traversed straight lines with intersecting points as points, and straight lines without intersecting points as crosses.

The points of intersection are suitable for reproducing the workpiece contour. When machining along three axes, the points of intersection are part of the final workpiece contour, if there are no additional points of intersection with a smaller z-coordinate.

Based on the determined contour points, a grid surface, e.g., a triangular grid, is formed, which describes the surface of the workpiece and can be rendered on a graphics display. It will be assumed in the following that two such grid surfaces are present, one for the CAD geometry and a second grid that is generated based on the NC program data.

Assuming that there is a difference between the two workpiece contours, a volume difference between the contour points of a first and a second grid surface can be computed, for example, by forming for each straight line G of the family of straight lines the difference DIFF of the points of intersection SP1, SP2 with each of the grid surfaces FN1, FN2.

FIG. 3 illustrates this relationship with reference to a grid structure in three-dimensional space x, y, z. The straight lines G of the family of straight lines intersect the two grid surfaces FN1, FN2 at corresponding points of intersection SP, of which exemplary points of intersection and/or contour points SP1, SP2 are indicated. The distance between these two points represents a discrete difference value DIFF along the z-direction. In the same way, a corresponding difference can be computed for the other lines of the family and used to graphically render a difference volume.

A difference volume can be easily determined by connecting the associated points of intersection between the first grid surface FN1 and four adjacent lines of the family which form the corners of a rectangle (in special situations a square). The same is done for the second grid surface FN2. Thereafter, the volume enclosed between the two planes is determined (see, for example, the exemplary partial volumes TV1, ..., TVn depicted in FIG. 3). This is done until all the lines of the family have been accounted for. Alternatively, three adjacent lines of the family forming a triangle or other geometric forms can be used with similar results. Using four points makes determining the difference volume particularly simple.

The differences are determined for the general case with two contour surfaces by moving from an arbitrary point on one surface perpendicular/vertical upwardly or downwardly until intersecting the second surface. The obtained distance is the desired difference value DIFF.

The difference can be visualized after the distance between the two triangular grids has been calculated at every point. For this purpose, the distances at the grid points of a triangular grid can be rendered in color by linear interpolation. Alternatively, the volume reflected by the distances can be visualized. This can be done, for example, in the calculation of the distance "in the z-direction", wherein the error volume is placed on a grid, either transparent or with interpolated colors (single color or multiple colors).

The determined spatial difference of the contours can now be visualized together with the contour points of one of the two grid surfaces, for example, by graphically rendering the grid surface on a display in a first color and by interpolating and rendering the determined volume difference values in another color as projections on the surface of the workpiece that is described by the grid surface. Those areas showing a deviation can then be localized directly on the surface.

The colors can be interpolated by first determining the extreme difference values (minimum, maximum), which are then associated with the colors blue (minimum) and red (maximum). The colors for other difference values can then be linearly interpolated on the blue/red scale. Chromatic and achromatic color ranges between blue and red can be selected.

The volume difference values are projected on the surface by visualizing and simultaneously coloring a set of points (for example the points of intersection of the family of straight lines) with the previously determined color values. In addition, the colors of the grid surface (with or without fill) can be interpolated according to the projected color values.

The projection can be performed with a 3-D graphics library, whereby different colors can be associated with the visualized points through the material binding "PER_VERTEX".

As mentioned above, the determined contour difference (discrete difference values) themselves can also be modeled as a volume and applied to the surface described by the grid surface, for example, by interpolating the colors of the difference volume. Alternatively, the difference volume can also be rendered transparent.

The difference volume can be visualized using eight points of intersection with the vertical auxiliary straight lines (family of straight lines) which form a discrete representation of the blank workpiece. These points of intersection can be connected to form a body, whereby each of the lateral surfaces is parallel to a coordinate plane.

The body can be rendered either transparent, for example by modeling the body using a special grid class of a 3-D graphics library and assigning a transparency index. The body can be rendered in color by coloring the volume according to the point of the body having the maximum distance, or by taking into consideration all corner points of the body. The color of the volume body is then interpolated and changes inside the volume.

In another approach for visualizing the differences between grids by coloring, positive differences (grid FN2 is located above grid FN1) can be colored for example blue, and negative differences (grid FN2 is located below grid FN1) can be colored for example red. This allows a quick determination if too much material has already been milled off during sizing (pointing, for example, to an error in the sizing program).

The graphic representation according to the invention makes it easy for a user to judge surface quality and to determine if tolerance limits have been exceeded.

The process of the invention advantageously improves the fabrication process, for example, by providing the model maker with a tool to immediately verify the generated NC parts programs. As a result, the entire milling process can be improved, making the process more cost-effective.

While the invention has been illustrated and described in connection with preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents.

What is claimed is:

1. A method for determining excessive tolerances in the generation of NC parts programs comprising:
   converting a predetermined CAD geometry into a first grid, said first grid defining a first grid surface,
   generating NC program data of an NC parts program based on the predetermined CAD geometry,
   generating a second grid from the NC program data said second grid defining a second grid surface corresponding to one of the NC program data and a control output,
   determining distance values between the first grid and the second grid, rendering a visualization of one of the determined distance values, and the distance values that exceed a predetermined tolerance threshold computing corresponding difference volume values from the determined distance values, and rendering a visualization of the difference volume values as interpolated colors, with the interpolated color of a volume value interpolated between a color assigned to a maximum volume value and a color assigned to a minimum volume value.

2. The method of claim 1, wherein the first grid and the second grid are triangular grids.

3. The method of claim 2, and further comprising the steps of defining geometric attributes of a tool to be used in an NC machining operation, and determining the second grid surface by taking into account the geometric tool attributes at least for the NC program data.

4. The method of claim 3, wherein the distance values between the first grid and the second grid correspond to a vertical distance determined in a positive or negative z-direction.

5. The method of claim 3, wherein the distance values between the first grid and the second grid correspond to a distance in a surface-normal direction of at least one of the first and second grids.

6. The method of claim 3, wherein the distance values between the first grid and the second grid correspond to an actual distance between the first grid and the second grid at a grid point.

7. The method of claim 1, and further comprising the step of graphically displaying the surface of one of the first and second grid surfaces together with the determined distance values.

8. The method of claim 7, wherein the determined distance values are visualized as a fourth attribute of the displayed surface.

9. The method of claim 1, and further comprising the steps of interpolating the determined distance values and forming an interpolated grid surface and graphically displaying the interpolated grid surface.

10. The method of claim 1, and further comprising the steps of rendering the determined distance values as interpolated colors, with the interpolated color of a distance value interpolated between a color assigned to a maximum distance value arid a color assigned to a minimum distance value, and projecting the rendered color onto the second surface that has a different color.

11. The method of claim 1, wherein the difference volume values are rendered transparent.

12. The method of claim 1, wherein the first and second grid surfaces are defined analytically and the distance values are determined continuously based on values derived from the analytically defined first and second surfaces.

13. The method of claim 1, and further comprising the steps of determining in three-dimensional space from data corresponding to a workpiece a plurality of discrete support points, said support points located on the first and second grid surfaces, and forming distance values between corresponding support points located on the first and second grid surfaces.

14. The method of claim 13, and further comprising the steps of defining a family of straight lines extending parallel to a coordinate axis in a three-dimensional space; modeling the workpiece with a blank workpiece using the family of straight lines; intersecting the family of straight lines with a virtual machining tool according to a predetermined machining path; and defining from the resulting points of intersection a grid surface corresponding to a workpiece contour.

15. The method of claim 14, wherein for simulating machining with three coordinate axes, only those points of intersection are taken into consideration that have the smallest coordinate value in the direction of a straight line towards the grid surface that corresponds to the workpiece contour.

16. The method of claim 14, wherein for straight lines without a point of intersection, an initialization value is used for forming the grid surface that corresponds to the workpiece contour.

17. The method of claim 14, and further comprising the step of defining at least one other family of straight lines extending parallel to at least one other coordinate axis in the three-dimensional space, wherein the modeled blank workpiece is represented by discrete values in the direction of the at least one other coordinate axis, and wherein the lines of the family in the direction of the at least one other coordinate axis are equidistant from each other.

18. Use of a method for determining excessive tolerances in the generation of NC parts programs in a virtual manufacturing operation of a workpiece that employs different machining instructions, the method comprising the steps of:
converting a predetermined CAD geometry into a first grid, said first grid defining a first grid surface,
generating NC program data of an NC parts program based on the predetermined CAD geometry,
generating a second grid from the NC program data, said second grid defining a second grid surface corresponding to one of the NC program data and a control output,
determining distance values between the first grid and the second grid, rendering a visualization of one of the determined distance values and the distance values that exceed redetermined tolerance threshold, computing corresponding difference volume values from the determined distance values, and rendering a visualization of the difference volume values as interpolated colors, with the interpolated color of a volume value interpolated between a color assigned to a maximum volume value and a color assigned to a minimum volume value.

19. A device for determining excessive tolerances in the generation of NC parts programs comprising:
means for converting a predetermined CAD geometry into a first grid, said first grid defining a first grid surface,
means for generating NC program data of an NC parts program based on the predetermined CAD geometry,
means for generating a second grid from the NC program data, said second grid defining a second grid surface corresponding to one of the NC program data and a control output,
means for determining distance values between the first grid and the second grid,
means for rendering a visualization of one of the determined distance values and the distance values that exceed a predetermined tolerance threshold, means for computing corresponding difference volume values from the determined distance values, and means for rendering a visualization of the difference volume values as interpolated colors, with the interpolated color of a volume value interpolated between a color assigned to a maximum volume value and a color assigned to a minimum volume value.

20. A computer program product adapted to run on a digital simulation computer, the computer program comprising:
computer program means for converting a predetermined CAD geometry into a first grid, said first grid defining a first and surface,
computer program means for generating NC program data of an NC parts program based on the predetermined CAD geometry,
computer program means for generating a second grid from the NC program data, said second grid defining a second grid surface corresponding to one of the NC program data and a control output,
computer program means for determining distance values between the first grid and the second grid,
computer program means for rendering a visualization of one of the determined distance values and the distance values that exceed a predetermined tolerance threshold, computer program means for computing corresponding difference volume values from the determined distance values, and computer program means for rendering a visualization of the difference volume values as interpolated colors, with the interpolated color of a volume value interpolated between a color assigned to a maximum volume value and a color assigned to a minimum volume value.

* * * * *

UNITED STATES PATENT AND TRADEMARK OFFICE
CERTIFICATE OF CORRECTION

PATENT NO. : 6,879,874 B2
DATED : April 12, 2005
INVENTOR(S) : Christof Sinn

It is certified that error appears in the above-identified patent and that said Letters Patent is hereby corrected as shown below:

Column 8,
Line 61, change "arid" to -- and --,

Column 9,
Line 50, change "redetermined" to -- a predetermined --.

Signed and Sealed this

Thirteenth Day of September, 2005

JON W. DUDAS
*Director of the United States Patent and Trademark Office*